United States Patent
Wiedemeier et al.

(10) Patent No.: US 9,141,386 B2
(45) Date of Patent: Sep. 22, 2015

(54) VECTOR LOGICAL REDUCTION OPERATION IMPLEMENTED USING SWIZZLING ON A SEMICONDUCTOR CHIP

(75) Inventors: Jeff Wiedemeier, Austin, TX (US); Sridhar Samudrala, Austin, TX (US); Roger Golliver, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 12/890,485

(22) Filed: Sep. 24, 2010

(65) Prior Publication Data
US 2012/0079233 A1    Mar. 29, 2012

(51) Int. Cl.
*G06F 9/305* (2006.01)
*G06F 9/30* (2006.01)
*G06F 15/76* (2006.01)
*G06F 9/06* (2006.01)
*G06F 7/00* (2006.01)

(52) U.S. Cl.
CPC .............. *G06F 9/30029* (2013.01); *G06F 7/00* (2013.01); *G06F 9/06* (2013.01); *G06F 9/30032* (2013.01); *G06F 9/30036* (2013.01); *G06F 15/76* (2013.01)

(58) Field of Classification Search
USPC .......................................................... 712/223
See application file for complete search history.

(56) References Cited

U.S. PATENT DOCUMENTS

| | | | |
|---|---|---|---|
| 4,791,551 A * | 12/1988 | Garde | 712/220 |
| 4,839,845 A * | 6/1989 | Rusterholz et al. | 708/520 |
| 6,023,751 A * | 2/2000 | Schlansker et al. | 712/1 |
| 6,745,319 B1 * | 6/2004 | Balmer et al. | 712/223 |
| 7,370,132 B1 * | 5/2008 | Huang et al. | 710/307 |
| 2005/0132165 A1 | 6/2005 | Ford et al. | |
| 2008/0139301 A1 * | 6/2008 | Holthe | 463/25 |
| 2009/0109219 A1 * | 4/2009 | DeCoro et al. | 345/423 |
| 2009/0172358 A1 | 7/2009 | Sperber et al. | |
| 2010/0106940 A1 | 4/2010 | Muff et al. | |

FOREIGN PATENT DOCUMENTS

| | | |
|---|---|---|
| CN | 101236511 | 8/2008 |
| JP | 2001-128067 | 5/2001 |
| JP | 2005-174293 | 6/2005 |
| WO | WO2009144681 | 12/2009 |

OTHER PUBLICATIONS

Microsoft (Shader Model 4); 9 pages; note that while the build date of the page was in 2012, Shader Model 4 itself was released in 2006; http://msdn.microsoft.com/en-us/library/windows/desktop/bb509657(v=vs.85).aspx.*

"Packed Multiply Accumulate Signed High Doubleword to Signed Quadword," AMD64 Technology, 43479-Rev. 3.01, PMACSDQH Instruction Reference, Aug. 2007, pp. 160-165.

(Continued)

*Primary Examiner* — Keith Vicary
(74) *Attorney, Agent, or Firm* — Nicholson De Vos Webster & Elliott, LLP

(57) ABSTRACT

A semiconductor processor is described. The semiconductor processor includes logic circuitry to perform a logical reduction instruction. The logic circuitry has swizzle circuitry to swizzle a vector's elements so as to form a swizzle vector. The logic circuitry also has vector logic circuitry to perform a vector logic operation on said vector and said swizzle vector.

16 Claims, 10 Drawing Sheets

(56) References Cited

OTHER PUBLICATIONS

Office Action from counterpart Japanese Patent Application No. 2013-530381, mailed Apr. 1, 2014, 4 pages, English summary included.

Office Action from counterpart Korean Patent Application No. 10-2013-7008144, mailed May 1, 2014, 2 5 pages, English summary included.

Patent Abstracts of Japan; Publication No. 2005-174293, Date of publication Jun. 30, 2005, Application No. 2004-308630, Filing Date: Oct. 22, 2004, Applicant ARM LTD.

Patent Abstract of Japan; Publication No. 2001-128067, Date of Publication May 11, 2001, Application No. 11-304590, Filing Date: Oct. 26, 1999, Applicant: Natl Inst of Advanced Industrial Science & Technology Meti Kawatetsu Techno Res Copr DHT Corp OBA Kotaro.

First Office Action from CN counterpart Application No. 201180045783.X, Mailed Oct. 21, 2014, 4 pages.

CN Search Report from CN counterpart Application No. 201180045783.X, Mailed Oct. 13, 2014, 2 pages.

\* cited by examiner

```
START
INPUT VECTOR = A, B, C, D, E, F, G, H
RESULT = (INPUT VECTOR [1]) AND (INPUT VECTOR [2])
DO N = 3 TO 8
RESULT = (RESULT) AND (INPUT VECTOR [N])
NEXT N
END
```

US 9,141,386 B2

VECTOR LOGICAL REDUCTION OPERATION IMPLEMENTED USING SWIZZLING ON A SEMICONDUCTOR CHIP

FIELD OF INVENTION

The field of invention relates generally to computer systems, and, more specifically, to a processor architecture for performing a vector logical reduction.

BACKGROUND

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 1A and 1B present a comparative example that demonstrates the basic difference between a scalar processor and a vector processor.

FIG. 1A shows an example of a scalar AND instruction in which a single operand set, A and B, are ANDed together to produce a singular (or "scalar") result C (i.e., AB=C). By contrast, FIG. 1B shows an example of a vector AND instruction in which two operand sets, A/B and D/E, are respectively ANDed together in parallel to simultaneously produce a vector result C, F (i.e., AB=C and DE=F).

As is well known in the art, typically, both input operands and output result are stored in dedicated registers. For example, many instructions will have two input operands. Therefore two distinct input registers will be used to temporarily store the respective input operands. Moreover, these same instructions will produce an output value which will be temporarily stored in a third (result) register. Respective input 101a,b and 102a,b and result registers 103a,b are observed in FIGS. 1A and 1B. Notably, the "scalar" vs. "vector" characterizations are readily discernable.

That is, input registers 101a and 102a of the scalar design of FIG. 1A are observed holding only scalar values (A and B, respectively). Likewise, the result register 103a of the scalar design of FIG. 1A is also observed holding only a scalar value (C). By contrast, the input registers 101b and 102b of the vector system of FIG. 1B are observed holding vectors (A,D in register 101b and B,E in register 102b). Likewise, the result register 103b of the vector system of FIG. 1B is also observed holding a vector value (C,F). As a matter of terminology, the contents of each of the registers 101b, 102b and 103b of the vector system of FIG. 1B can be globally referred to as a "vector", and, each of the individual scalar values within the vector can be referred to as an "element". Thus, for example, register 101b is observed to be storing "vector" A, D which is composed of "element" A and "element" D.

Some computer systems, regardless if the underlying processor is of scalar or vector design, effectively require a logical operation across elements of a single vector. In the case of, for example, an eight input AND operation (the logical diagram of which is shown in FIG. 2A), eight separate inputs (A, B, C, D, E, F, G, H) are ANDed together to produce a final scalar result (R). In the case of scalar processors, loop operations have to be written in software that accumulate the result over seven iterations of a scalar AND instruction (the pseudo-code for which is shown in FIG. 2B). Thus, in the case of a scalar processor, the multiple iterations require multiple executions of the scalar AND instruction in order to perform the calculation.

By contrast, a vector processor can entertain the prospect of implementing such an operation with the execution of a single instruction designed to perform the logical operation outright.

FIGURES

The present invention is illustrated by way of example and not limitation in the figures of the accompanying drawings, in which like references indicate similar elements and in which.

DETAILED DESCRIPTION

Figure 1A:
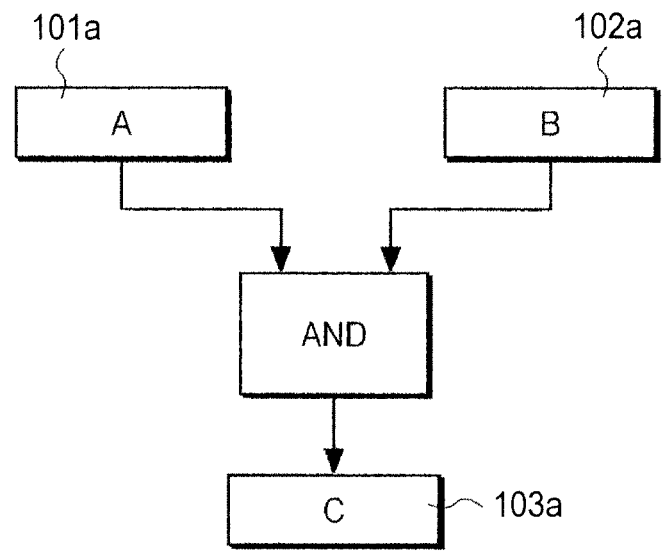
FIGS. 1A and 1B show scalar and vector logic operations.
Figure 1B:
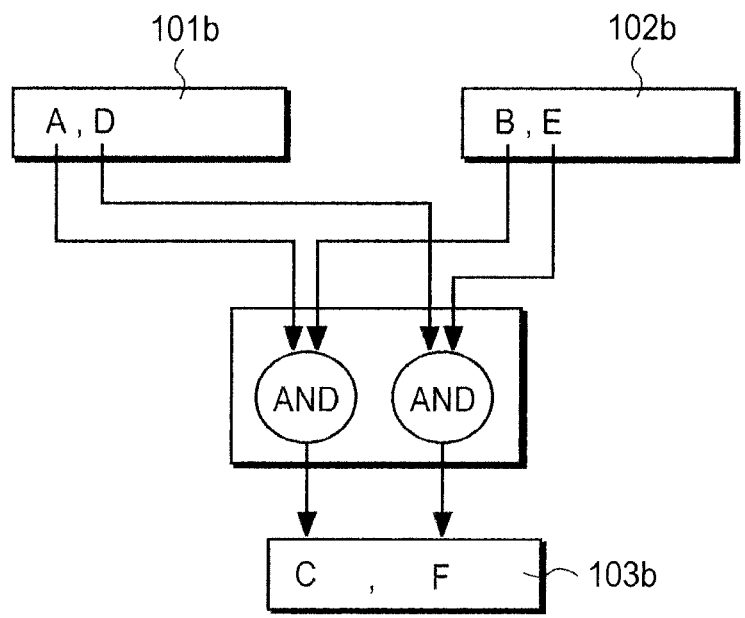
Figures 2A, 2B:
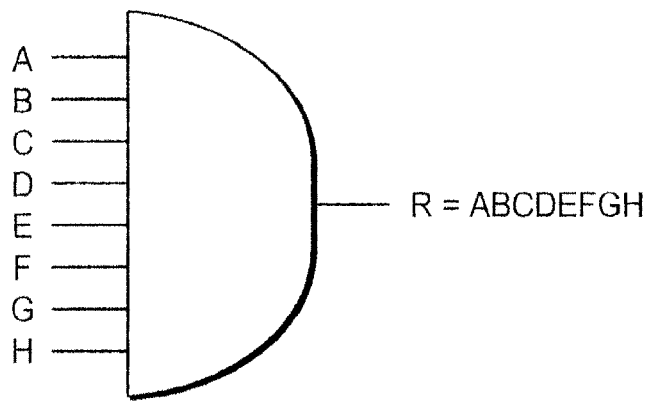
FIGS. 2A and 2B show a logic diagram of an eight input AND function and corresponding pseudo code with a scalar AND instruction.
Figure 3:
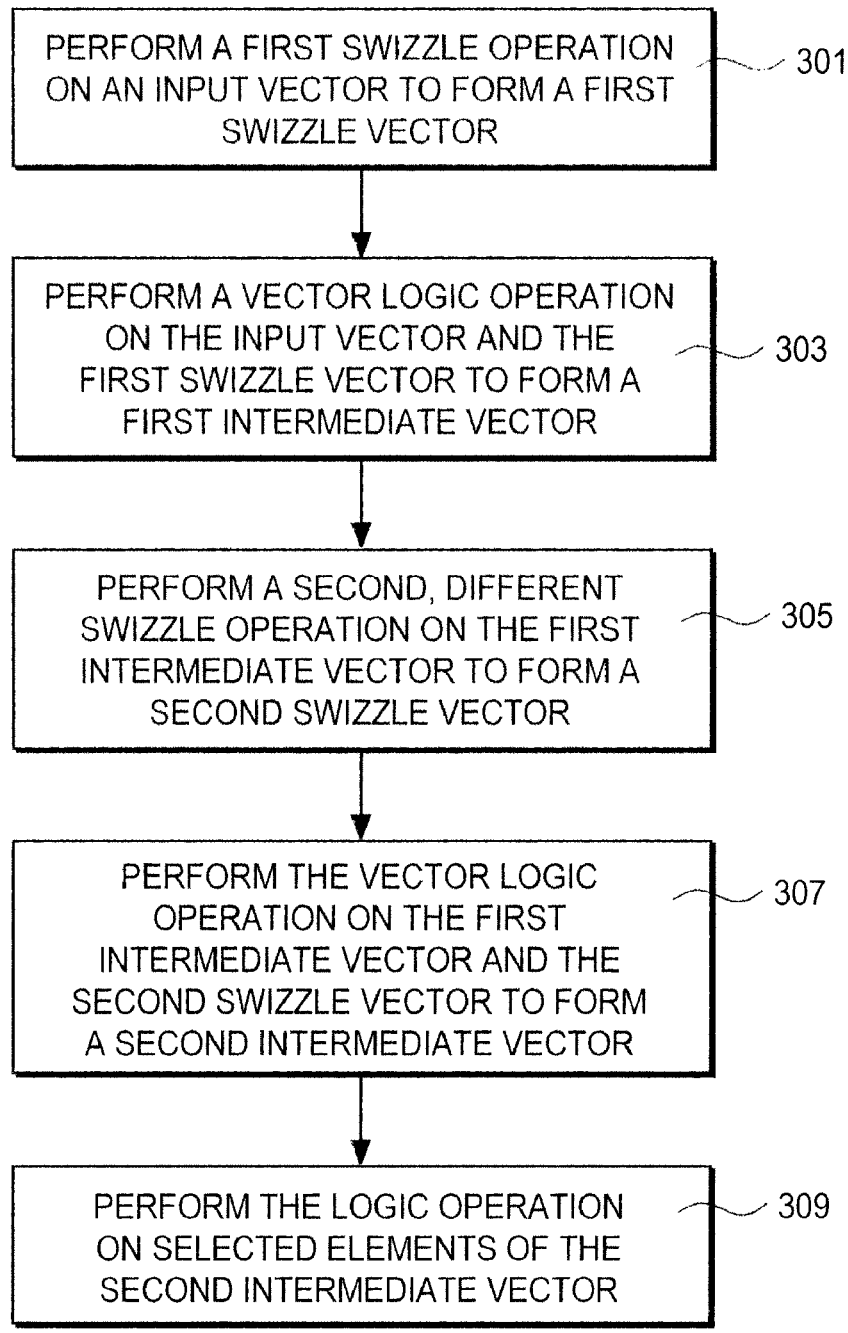
FIG. 3 shows a process to be performed by a semiconductor processor for performing a logical reduction operation.
Figure 4:
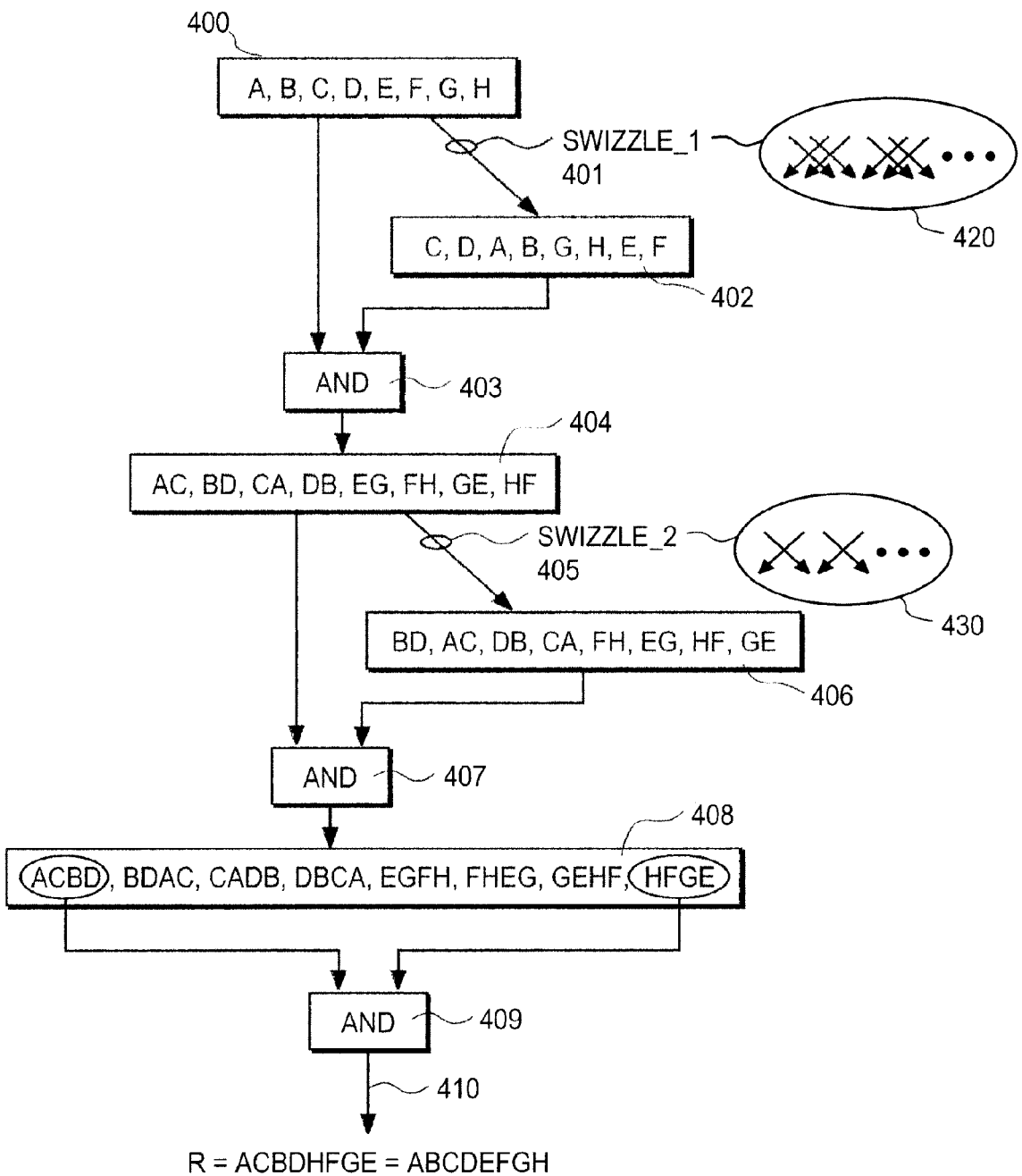
FIG. 4 shows a first embodiment of the process of FIG. 3.

FIG. 3 shows a methodology for performing a logical operation across elements of a vector, also referred to as a "logical reduction", on a processor capable of executing vector instructions. FIG. 4 shows an example of an eight input AND function that conforms to the methodology of FIG. 3. Reference will be made to both FIGS. 3 and 4 to assist the reader's understanding of the methodology of FIG. 3. In the example of FIG. 4, the vector input 400 has the elements (A, B, C, D, E, F, G, H) that are to be ANDed together by way of the eight input AND to produce output result R=ABCDEFGH.

According to the methodology of FIG. 3, a first swizzle operation is performed 301, 401 on the vector input 400 to produce a first swizzle vector 402. In the example of FIG. 4, the first swizzle operation 401 is a dual swizzle operation in which the location of neighboring pairs of elements are swapped as observed in the pattern shown at inset 420. A vector logic operation of the reduction's logical operation is then performed 303, 403 using the vector input 400 and the first swizzle vector 402 as input vectors. In the example of FIG. 4, because the logical reduction corresponds to an eight input AND function, logical operation 303, 403 corresponds to a vector AND operation. It is noteworthy, however, that other logical reduction and corresponding logical operations having a commutation operation (such as OR, "add" (ADD) and "multiply" (MUL)) can be made to conform to the approach of FIG. 3.

The result of the logical operation 303, 403 produces a first intermediate result 404. A second swizzle operation 305, 405 that is different than the first swizzle operation is performed on the first intermediate result 404 to produce a second swizzle vector 406. In the example of FIG. 4, the second swizzle operation 405 is a single swizzle operation in which the location of neighboring elements are swapped as observed in the pattern shown at inset 430. Another vector logic operation of the reduction's logical operation is then performed 307, 407 using the first intermediate result 404 and the second swizzle vector 406 as vector inputs.

Again, because the example of FIG. 4 corresponds to a logical AND reduction, logical operation 407 of FIG. 4 corresponds to a vector AND operation. The result of the second vector logical operation 307, 407 produces a second intermediate result 408. A logic operation of the reduction's logical operation is then performed 309, 409 on selected elements of the second intermediate result 408 to produce the sought for reduction result 410. In the example of FIG. 4, the selected elements of the second intermediate result correspond to the elements in the first and eighth positions of the second intermediate result 408. However, inspection of the second intermediate result 408 reveals that the selection of any of one of the $1^{st}$ through $4^{th}$ elements, and, any one of the $5^{th}$ through $8^{th}$ elements will produce the correct reduction result.

In order to prevent the design of specialized logic and/or micro-code operations to perform the last logical operation 309, 409, some formatting steps may be performed on the second intermediate result 408 so that the same vector logic operation used in steps 303,403 and 307,407 is used to implement operation 309, 409 (i.e., in the case of the example of FIG. 4, a vector AND operation). For example, a vector may be constructed that conforms to one of the selected elements being placed in the same vector location as the other selected element and padding the remaining vector element values with 0s (e.g., in the example of FIG. 4, formatting vector 408 to create constructed vector [0, 0, 0, 0, 0, 0, 0, ACBD]). Performing a vector AND operation on the constructed vector and the second intermediate result 408 produces the desired logical reduction result 410 in the same vector location of the output vector where the selected operand is found in the constructed vector (i.e., using the aforementioned constructed vector example, R=0, 0, 0, 0, 0, 0, 0, ACBDHFGE).

Figure 5:
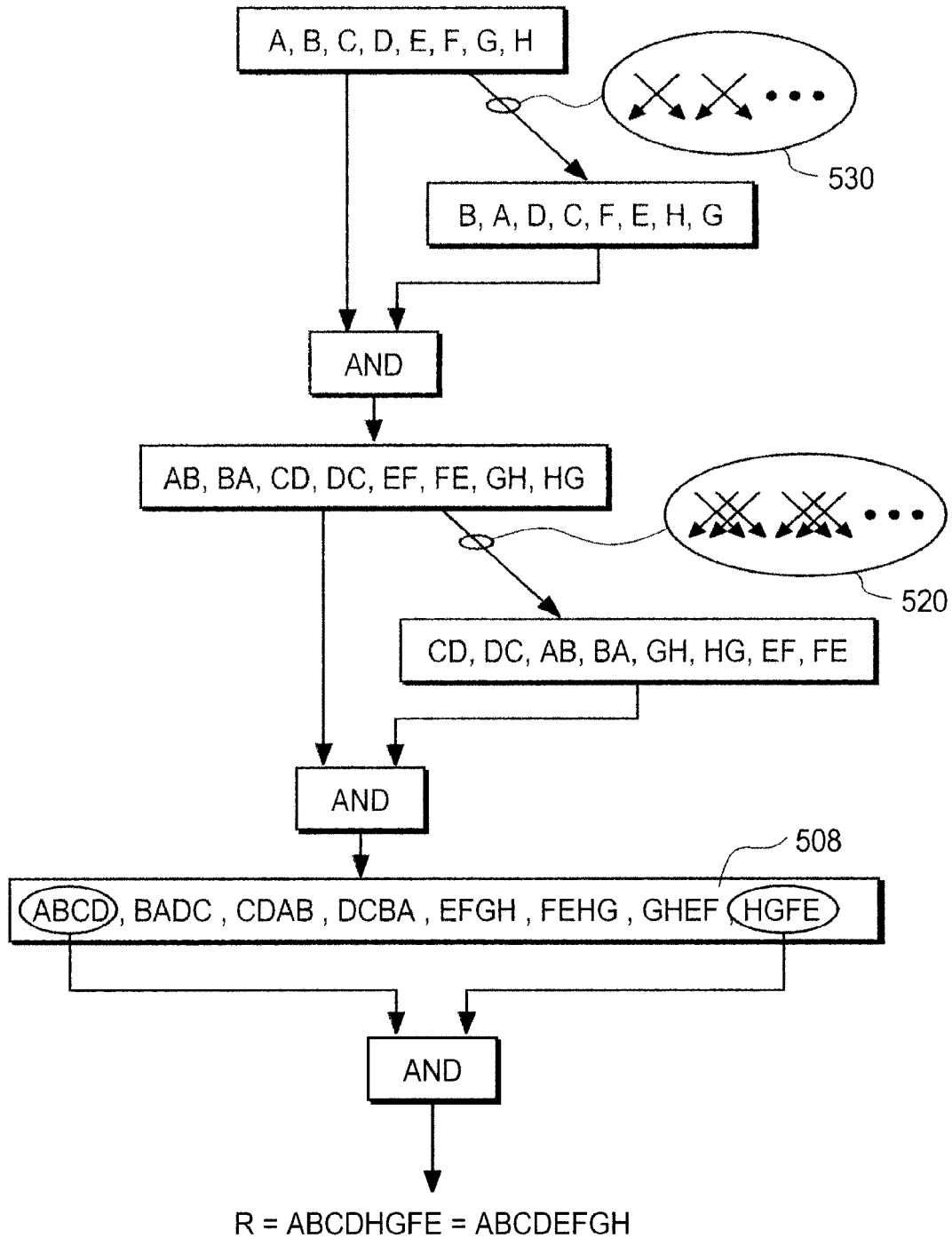
FIG. 5 shows a second embodiment of the process of FIG. 4.

It is pertinent to note that the sequence of different swizzle operations, as well as the swizzle operations themselves, may vary from embodiment to embodiment. For example, FIG. 5 corresponds to the example of FIG. 4 with the single swizzle pattern 530 being performed before the dual swizzle pattern 520. Comparing the examples of FIGS. 4 and 5, available terms are produced in the second intermediate vector 508 to obtain the correct result.

Figure 6A:
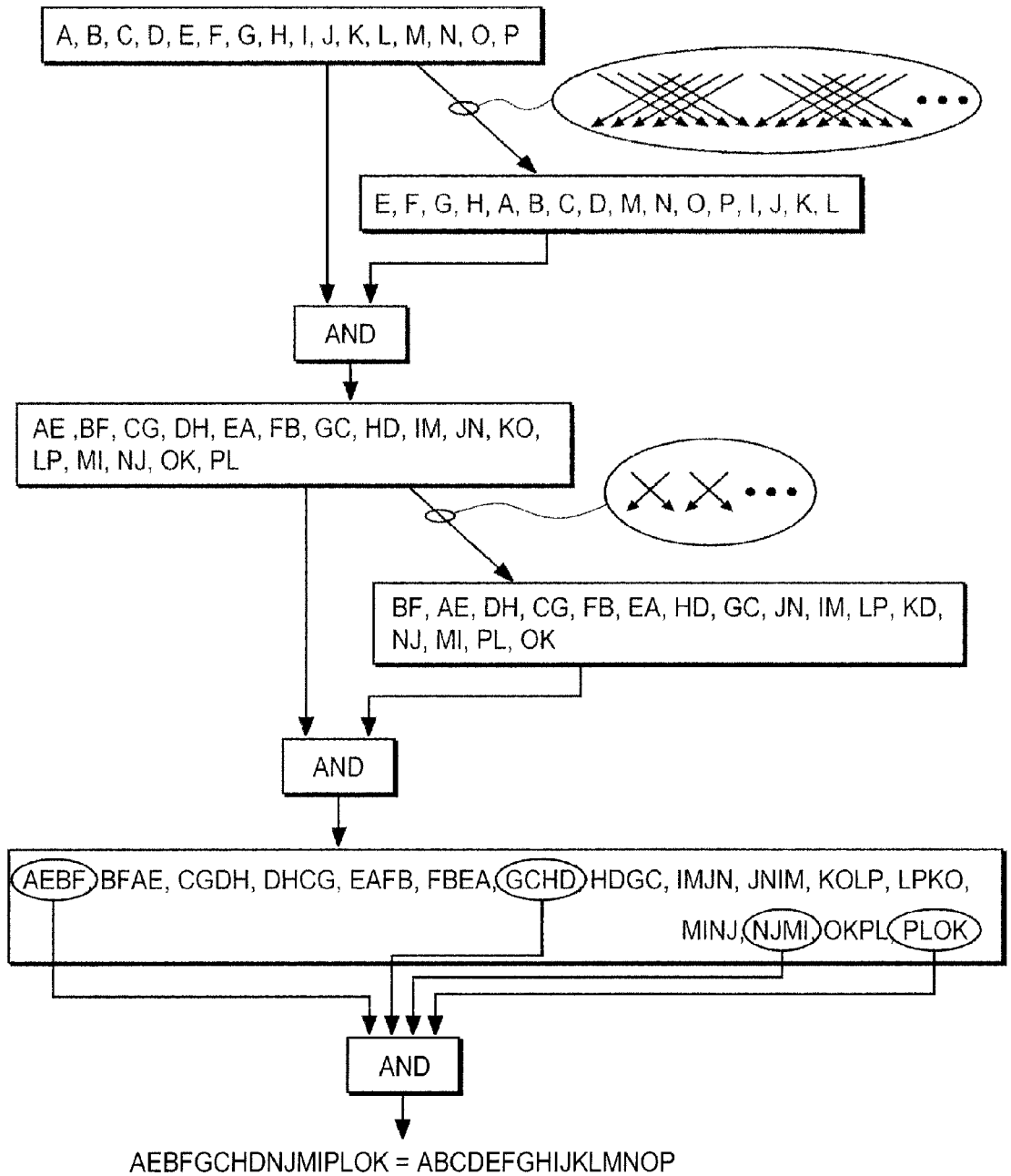
FIG. 6a shows a third embodiment of the process of FIG. 5.

It is also pertinent to note that different swizzle patterns besides the single and dual swizzle patterns 420/520, 430/530 discussed above may also be used. For example, FIG. 6A shows an example of a logical AND reduction on a 16 element vector that uses a quad swizzle pattern in which the locations of neighboring quintuplets of elements are swapped in a pattern.

Figure 6B:
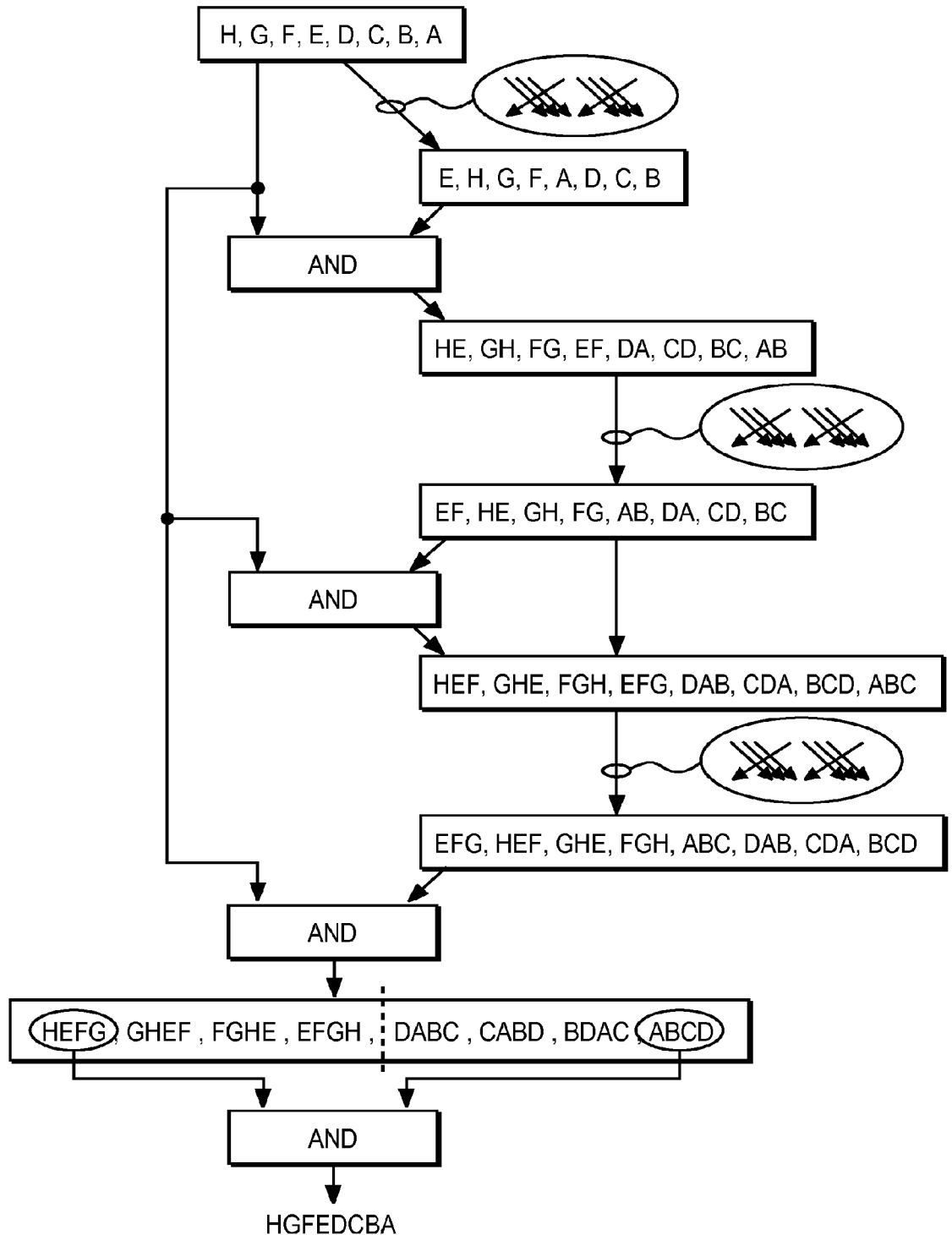
FIG. 6b shows an embodiment in which the swizzle operations are the same.

Also, the swizzling patterns themselves need not be different. For example, FIG. 6b shows a logical AND reduction where the same swizzle pattern is utilized end-to-end through the operation.

For any embodiment, those of ordinary skill will be able determine appropriate swizzle patterns, corresponding selection criteria of the second intermediate vector and any associated formatting prior to a last vector logic operation. Moreover, although the examples above have emphasized AND reductions, the same principles can also be applied to effect any operations having a commutative operation such as logical OR, add and multiply.

Figure 7:
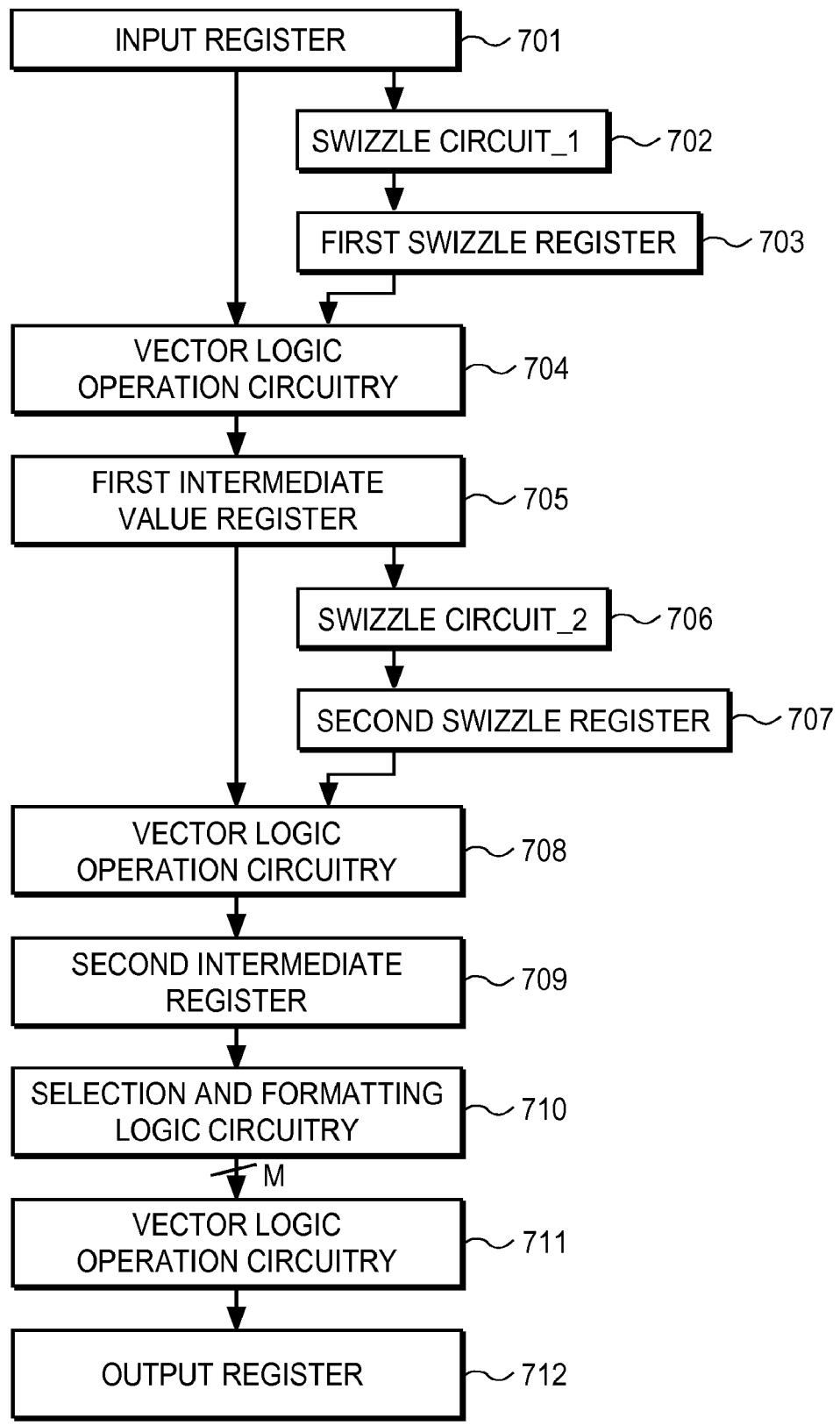
FIG. 7 shows a design of an electronic circuit that can perform the process of FIG. 3.

As discussed above, the logical reduction algorithm may be implemented as an instruction within the instruction set of a semiconductor processor. FIG. 7 shows a possible data path that may be implemented as logic circuitry within the execution units of a processor. According to the circuit diagram of FIG. 7, the input vector having the elements to be logically reduced through the logical reduction is stored in input register 701. The output of input of register 701 flows to the input of first swizzle circuitry 702 and the input of the first vector logic operation circuitry 704 that performs the first vector logic operation (e.g., a vector AND, vector OR, or vector XOR). The output of the first swizzle circuitry 702 flows into a first swizzle register 703. The output of the first swizzle register 703 flows into the first vector logic operation circuitry 704. As such, the first vector logic operation circuitry 704 accepts a first input vector from input register 701 and a second input vector from swizzle register 703.

First intermediate value register 705 holds the output vector produced by the first vector logic operation circuitry 704. The contents of first intermediate value register 705 are then provided to second swizzle logic circuitry 706 and second vector logic operation circuitry 708 that performs the second vector logic operation. The output of the second swizzle logic circuitry 706 is provided to a second swizzle register 707 which provides its output to second vector logic operation circuitry 708. Second vector logic operation circuitry 708 provides its output to second intermediate register 709. Selection and formatting logic 710 selects (and may format any of) the elements of the vector within the second intermediate register 709 that are needed as the operands for the final vector logic operation that is performed by third vector logic operation circuitry 711. The result of third vector logic circuitry 711 corresponds to the final result (the logical reduction) and is stored in output register 712. Note that, to implement the algorithm of FIG. 3, another stage of swizzle circuitry, intermediate vector register and vector logic circuitry (not shown) may be additionally incorporated into the circuitry of FIG. 7.

Various alternate logic designs that use some of the components of FIG. 7 yet still perform the logical reduction are also possible. For instance, if the circuitry for the logical reduction is dedicated to the execution of the logical reduction instruction in a "straight line" data path (e.g., without a plurality of micro-ops) any of registers 703, 705, 707, 709 may be eliminated. By contrast, if the logical reduction instruction is to be performed via micro-code with a number of corresponding micro-ops, a number of elements of FIG. 7 may be eliminated while others may be reused.

For instance, the first and second vector logic operations can be performed with vector logic operation circuitry 704 (such that vector logic operation circuitry 708 is eliminated) if the respective outputs of first intermediate register 705 and second swizzle register 707 are feedback as inputs to vector logic operation circuitry 704 (here it is understood that the micro-ops control multiplexers or other data path control circuits to properly move the data in conformity with the algorithm). Vector logic operation circuitry 711 can further be eliminated if the selection and formatting logic 710 accepts an input from first intermediate register 705 and provides its output back to vector logic operation circuitry 704 (which also performs the third and final logic operation).

The first and second swizzle circuits 702, 706 can also be merged into a common bank of multiplexers and/or de-multiplexers that switch between the correct swizzle patterns based on the state of their respective channel select input values. That is, the channel select inputs of the multiplexers and/or de-multiplexers receive a first input value that corresponds to the first swizzle pattern, and, receive a second input value that corresponds to the second swizzle pattern. The multiplexers and/or de-multiplexers form datapaths in response to the channel select values to effect the desired swizzle transfer.

In an extended implementation less than all of the elements of the input vector stored in input register 701 can be logically reduced with formatting circuitry (either preceding or following input register 701) that forces a benign value into the input vector for those elements that are not to be considered for the logical reduction. For instance, if the logical reduction is to be a logical reduction of only elements A, B, C, D of input vector A, B, C, D, E, F, G, H—then—formatting logic would insert values of all 1s for each of elements E, F, G and H such that the vector A, B, C, D, [all 1s], [all 1s], [all 1s], [all 1s] would be processed as the input vector for the reduction. For OR and XOR logical reductions, benign values correspond to all 0s rather than all 1s.

As discussed in reference to FIG. 7 above, the algorithm may be implemented within a vector logical reduction instruction that is executed by the execution units of a semiconductor processor.

Figure 8:
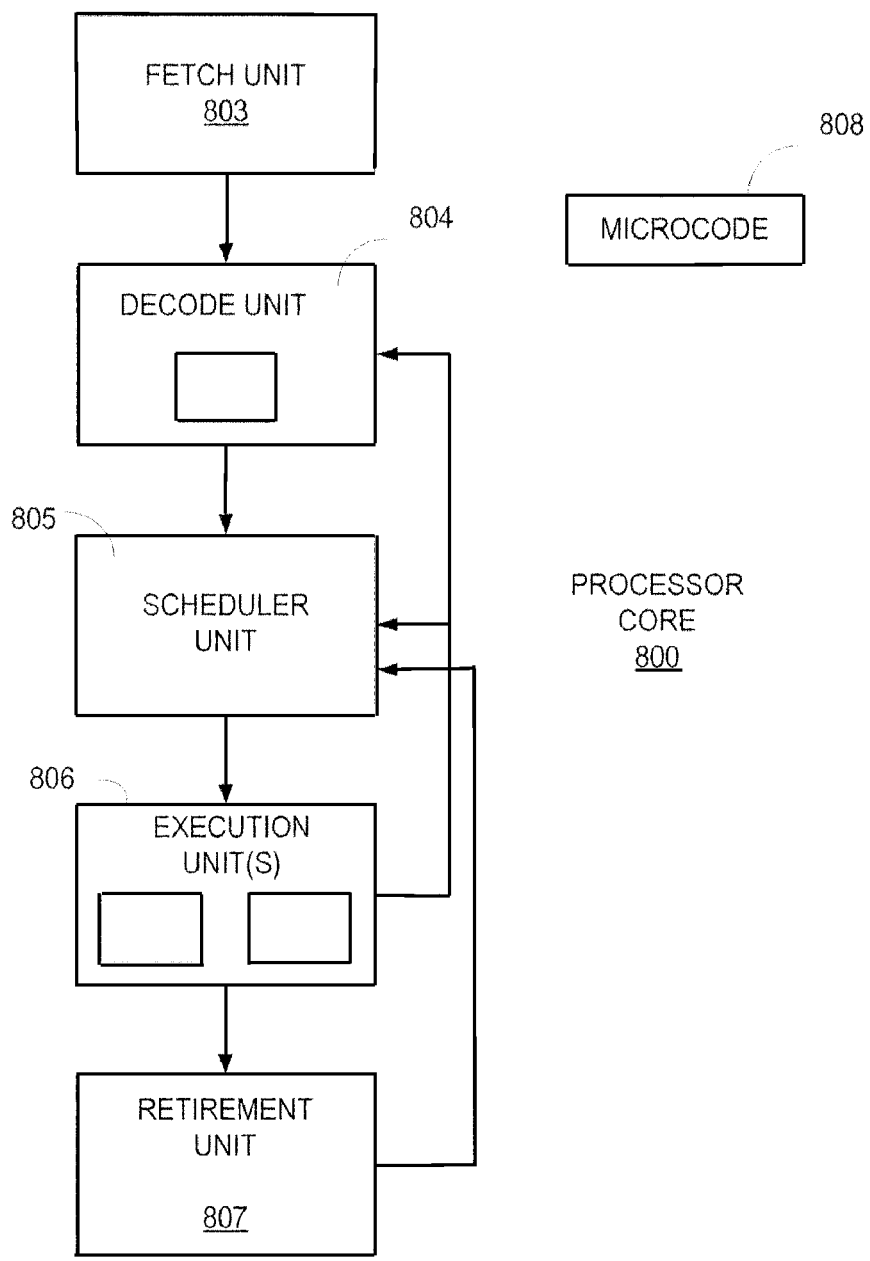
FIG. 8 shows a diagram of a semiconductor processor.

FIG. 8 shows a generic processing core 800 that is believed to describe many different types of processing core architectures such as Complex Instruction Set (CISC), Reduced Instruction Set (RISC) and Very Long Instruction Word (VLIW). The generic processing core 800 of FIG. 8 includes: 1) a fetch unit 803 that fetches instructions (e.g., from cache and/or memory); 2) a decode unit 804 that decodes instructions; 3) a schedule unit 805 that determines the timing and/or order of instruction issuance to the execution units 806 (notably the scheduler is optional); 4) execution units 806 that execute the instructions (typical instruction execution units include branch execution units, integer arithmetic execution units (e.g., ALUs), floating point arithmetic execution units (e.g., FPUs) and memory access execution units); and 5) a retirement unit 807 that signifies successful completion of an instruction. Notably, the processing core 800 may or may not employ microcode 808.

In the case of micro-coded processors, the micro-ops are typically stored in a non volatile machine readable medium (such as a Read Only Memory (ROM)) within the semiconductor chip that the processor is constructed on and cause the execution units within the processor to perform the desired function called out by the instruction.

Figure 9:
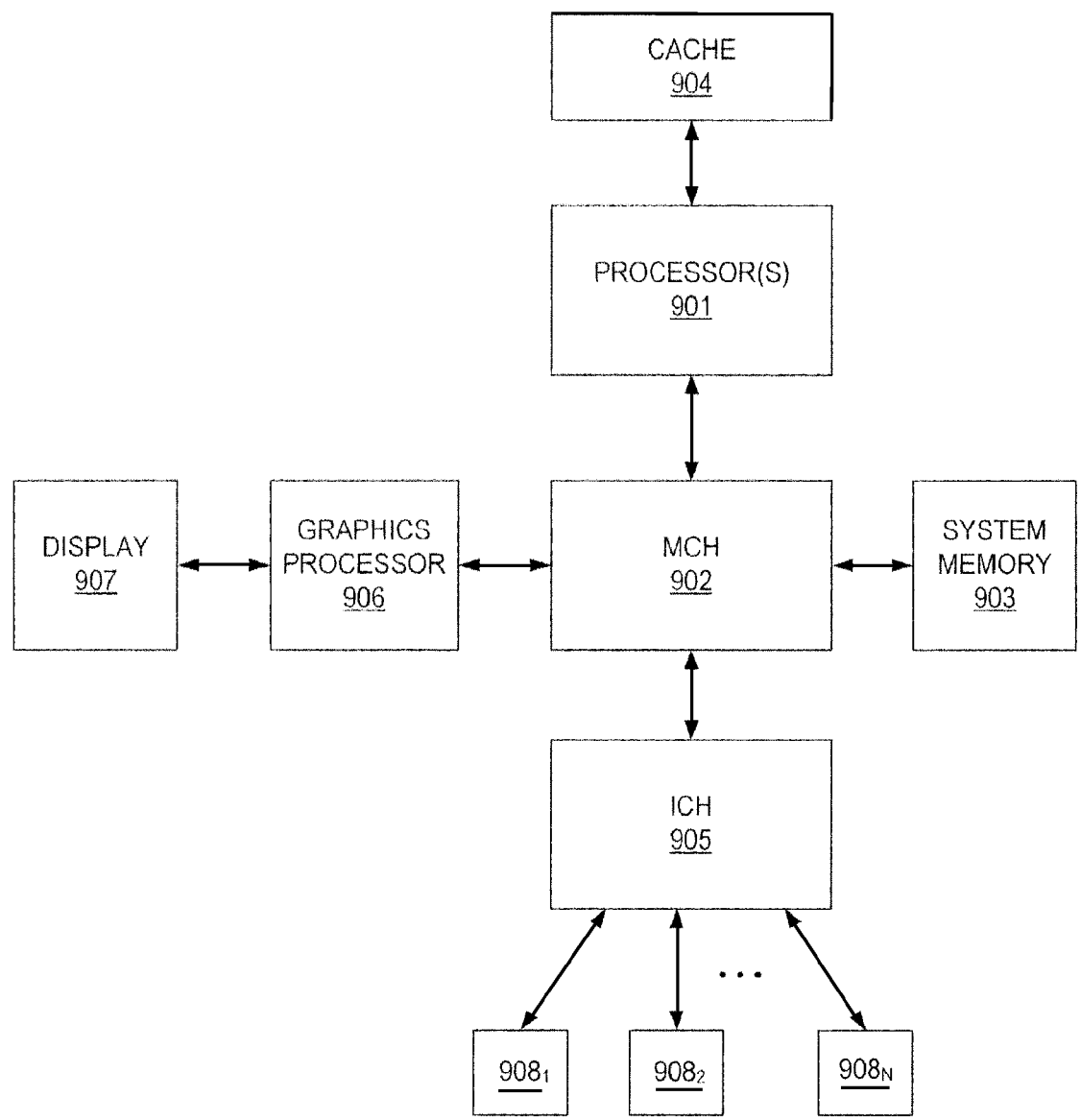
FIG. 9 shows a diagram of computing system.

A processor having a logical reduction instruction can be implemented into various computing systems as well. FIG. 9 shows an embodiment of a computing system (e.g., a computer). The exemplary computing system of FIG. 9 includes: 1) one or more processors 901 that may be design to include a vector logical reduction instruction; 2) a memory control hub (MCH) 902; 3) a system memory 903 (of which different types exist such as DDR RAM, EDO RAM, etc.); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), Digital Light Processing (DLP), etc.; 8) one or more I/O devices 908.

The one or more processors 901 execute instructions in order to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale nonvolatile storage within the computing system (e.g., hard disk drive). ICH 905 has bi-directional point-to-point links between itself and the observed I/O devices 908.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
executing a logical reduction instruction in a semiconductor processor, said executing comprising:
storing a vector having multiple elements into a register;
swizzling the elements of the vector with swizzle circuitry to form a first swizzled vector;
performing a vector logic operation with vector circuitry on the vector and the first swizzled vector to form a first intermediate vector;
swizzling all elements of said first intermediate vector with swizzle circuitry to form a second swizzled vector;
performing said vector logic operation with vector circuitry on said first intermediate vector and said second swizzled vector to form a second intermediate vector; and
performing a logic operation on less than all elements of said second intermediate vector.

2. The method of claim 1 wherein said vector logic operation and said logic operation are a vector AND operation and an AND operation.

3. The method of claim 1 wherein said vector logic operation and said logic operation are a vector OR operation and an OR operation.

4. The method of claim 1 wherein said vector logic operation and said logic operation are a vector XOR operation and an XOR operation.

5. The method of claim 1 wherein said logic operation that is performed on less than all elements of said second intermediate vector is a vector logic operation.

6. The method of claim 1 wherein said swizzle circuitry that forms said first swizzled vector and said swizzle circuitry that forms said second swizzled vector is the same swizzle circuitry.

7. A semiconductor processor comprising:
   swizzle circuitry to swizzle all elements of a vector to form a first swizzled vector; and
   vector circuitry to perform a vector logic operation on said vector and said first swizzled vector to form a first intermediate vector,
   wherein the swizzle circuitry is to swizzle all elements of said first intermediate vector to form a second swizzled vector, and the vector circuitry is to perform said vector logic operation on said first intermediate vector and said second swizzled vector to form a second intermediate vector and a logic operation on less than all elements of said second intermediate vector, such that the semiconductor processor is to perform a logical reduction of all elements of the vector responsive to execution of a single instruction.

8. The semiconductor processor of claim 7 wherein said swizzle circuitry comprises multiplexers.

9. The semiconductor processor of claim 7 wherein said swizzle circuitry comprises de-multiplexers.

10. The semiconductor processor of claim 7 further comprising a data-path from an output of said vector circuitry to an input of said vector circuitry.

11. The semiconductor processor of claim 10 further comprising a non-transitory read-only-memory (ROM) to store micro-ops to implement said single instruction.

12. The semiconductor processor of claim 10 wherein said vector logic operation is one of:
   a vector AND;
   a vector OR;
   a vector XOR.

13. A computing system comprising:
   a semiconductor processor to perform a logical reduction of all elements of a vector responsive to execution of a single instruction comprising:
      swizzle circuitry to swizzle all elements of said vector to form a first swizzled vector; and
      vector circuitry to perform a vector logic operation on said vector and said first swizzled vector to form a first intermediate vector, wherein the swizzle circuitry is to swizzle all elements of said first intermediate vector to form a second swizzled vector, and the vector circuitry is to perform said vector logic operation on said first intermediate vector and said second swizzled vector to form a second intermediate vector and a logic operation on less than all elements of said second intermediate vector; a graphics processor; and a display coupled to said graphics processor.

14. The computing system of claim 13 further comprising a data-path from an output of said vector circuitry to an input of said vector circuitry.

15. The computing system of claim 14 further comprising a non-transitory read-only-memory (ROM) to store micro-ops to implement said single instruction.

16. The computing system of claim 13 wherein said vector logic operation is one of:
   a vector AND;
   a vector OR;
   a vector XOR.

* * * * *